United States Patent
Arora et al.

(10) Patent No.: US 6,196,550 B1
(45) Date of Patent: Mar. 6, 2001

(54) PRESSURE BALANCED FINGER SEAL

(75) Inventors: Gulshan K. Arora; Donald L. Glick, both of Mesa, AZ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/248,441

(22) Filed: Feb. 11, 1999

(51) Int. Cl.[7] .................................................. F16J 15/447
(52) U.S. Cl. ............................................. 277/355; 277/926
(58) Field of Search .................................... 277/355, 928, 277/551, 552, 926, 579, 580

(56) References Cited

U.S. PATENT DOCUMENTS

| | | | |
|---|---|---|---|
| 5,108,116 | * | 4/1992 | Johnson et al. ...................... 277/355 |
| 5,799,952 | * | 9/1998 | Morrison et al. ..................... 277/355 |
| 5,884,918 | * | 3/1999 | Basu et al. ........................... 277/355 |

* cited by examiner

Primary Examiner—Anthony Knight
Assistant Examiner—Enoch Peavey
(74) Attorney, Agent, or Firm—Robert Desmond, Esq.

(57) ABSTRACT

An annular sealing apparatus is disclosed for disposition in cooperation with a body defining a bore and a rotating member rotatably received in the bore, the bore and rotating member bounding a high fluid pressure region and a relatively lower pressure fluid region therebetween, the sealing apparatus inhibiting fluid leakage between the high and lower fluid pressure regions, the sealing apparatus has a fore cover plate disposed in the high fluid pressure region and aft cover plate disposed in the lower pressure fluid region. A sealing element comprised of a plurality of comb-like diaphragm members is disposed between the two cover plates. Each of the diaphragm members has a foot portion that seals against the rotating member. A fore spacer is disposed between said fore cover plate and said sealing element and an aft spacer is disposed between said aft cover plate and said sealing element. The aft spacer has a plurality of cavities that are separated from the low fluid pressure region. A passageway is provided that places these cavities in fluid communication with the high fluid pressure region.

13 Claims, 5 Drawing Sheets

PRESSURE BALANCED FINGER SEAL

The United States Government has rights in the present invention pursuant to Contract No. NAS3-27752 issued by the National Aeronautics and Space Administration.

TECHNICAL FIELD

This invention relates generally to sealing devices disposed in association with two relatively rotatable members and providing a fluid seal therebetween. More particularly, the present invention relates to an apparatus for achieving sealing between a rotating member and a housing circumscribing the rotating member.

BACKGROUND OF THE INVENTION

Gas turbine engines employ sealing devices in various capacities where it is necessary to restrict the flow of fluid or gases from one portion of the engine to another. A common use is for separating the primary engine flowpath from the secondary flowpath. The primary engine flowpath directs the flow of gases to the compressor and turbine stages, from which the engine derives thrust or power. The secondary flowpath comprises a series of conduits for delivering compressed air throughout the engine for performing a variety of functions. Compressed air is used, for example, to cool individual components, provide a bleed air source, buffer the lubricated bearing cavities, control the ventilation among engine cavities and structures, and affect the thrust balance of the engine. Loss of compressed air from the secondary flowpath through leakage can have a substantial adverse effect on the performance of these functions. In a turbine engine, at least one sealing device typically is required for each turbine and compressor stage of the engine.

Another common use for sealing devices in turbine engines is for separating the secondary flowpath from engine cavities containing fluids such as lubricating oil. In pressurized aircraft, bleed air taken from the secondary flowpath supplies the aircraft environmental control system. Even small amounts of oil in the bleed air can render it unsuitable for this purpose. Further, oil leakage can lead to coking of the seal, and ultimately reduced seal life. To prevent this, buffered sealing devices typically are incorporated adjacent lubricated bearings and engine oil sumps.

Among the sealing devices more recently developed is the finger seal. Finger seals are comprised generally of a plurality of flexible members fixed at one end, the opposite ends sealingly engaging a surface that is rotatable relative thereto. The fingers of a finger seal are an integral part of the seal, usually formed by machining a series of curved slots in a forged ring or a length of sheet stock, the slots being of consistent length and extending from a common edge of the material. A complete seal is usually made up of two or more layers of fingers relatively positioned such that the gaps between fingers in one layer are blocked by the fingers of the next layer.

During engine operation, the fingers deform in a generally radially outward direction due to various factors including centrifugal growth of the rotating surface. In order to maintain an effective seal, it is also necessary for the fingers to restore themselves radially inward as the rotating surface shrinks. Fluid pressure acting on the radially deformed fingers, however, causes the fingers to deform axially often resulting in forceful contact between the fingers and adjacent structures. This axial deformation creates a frictional force that hampers radially inward recovery of the fingers as rotational velocity of the rotatable surface subsides. Consequently, the fingers are unable to re-engage the movable surface as it shrinks. Accordingly, the desired seal therebetween is undermined leading to engine inefficiencies.

Accordingly, a need exists for a seal capable of preventing or reducing the frictional forces between the finger members and adjacent structures such that the seal between the finger members and the movable surface is maintained during the full range of engine operation speed and power levels.

SUMMARY OF THE INVENTION

In accordance with the present invention, an annular sealing apparatus is disclosed for disposition in cooperation with a body defining a bore and a rotating member rotatably received in the bore. The bore and rotating member bound a high fluid pressure region and a relatively lower pressure fluid region therebetween. The sealing apparatus inhibits fluid leakage between the high and low fluid pressure regions.

In a preferred embodiment of the invention, the sealing apparatus is comprised of fore and aft annular cover plates. Disposed between these plates are a fore spacer, a sealing element, and an aft spacer. The sealing element comprises a plurality of comb-like diaphragm members extending radially inward from a continuous, circumferential band portion. Each diaphragm member has a plurality of uniformly spaced integral finger members, the foot portions of which sealingly contact the rotating member. The finger members of each diaphragm member have gaps therebetween. Each successive diaphragm member is positioned so that the finger members of each block the finger member gaps of other contiguous diaphragm members. The band portions have a plurality of circumferentially disposed holes which define an axial passage when the diaphragm members are assembled. The fore spacer has a plurality of radial passages which deliver high pressure fluid to the axial passage in the diaphragm members. From the axial pressure the high pressure fluid flows through radial passages in the aft space to cavities in the aft spacer. Thus, the net axial force or thrust exerted on the sealing element is greatly reduced when compared to the prior art configurations that do not have these pressure balancing passages. With this reduced axial force, the frictional force between aft spacer and the sealing element is reduced which eliminates or greatly reduces binding of sealing element against the aft spacer. The sealing element is now free to expand and contract radially as required to maintain sealing.

DESCRIPTION OF THE PREFERRED EMBODIMENT

Figure 1:
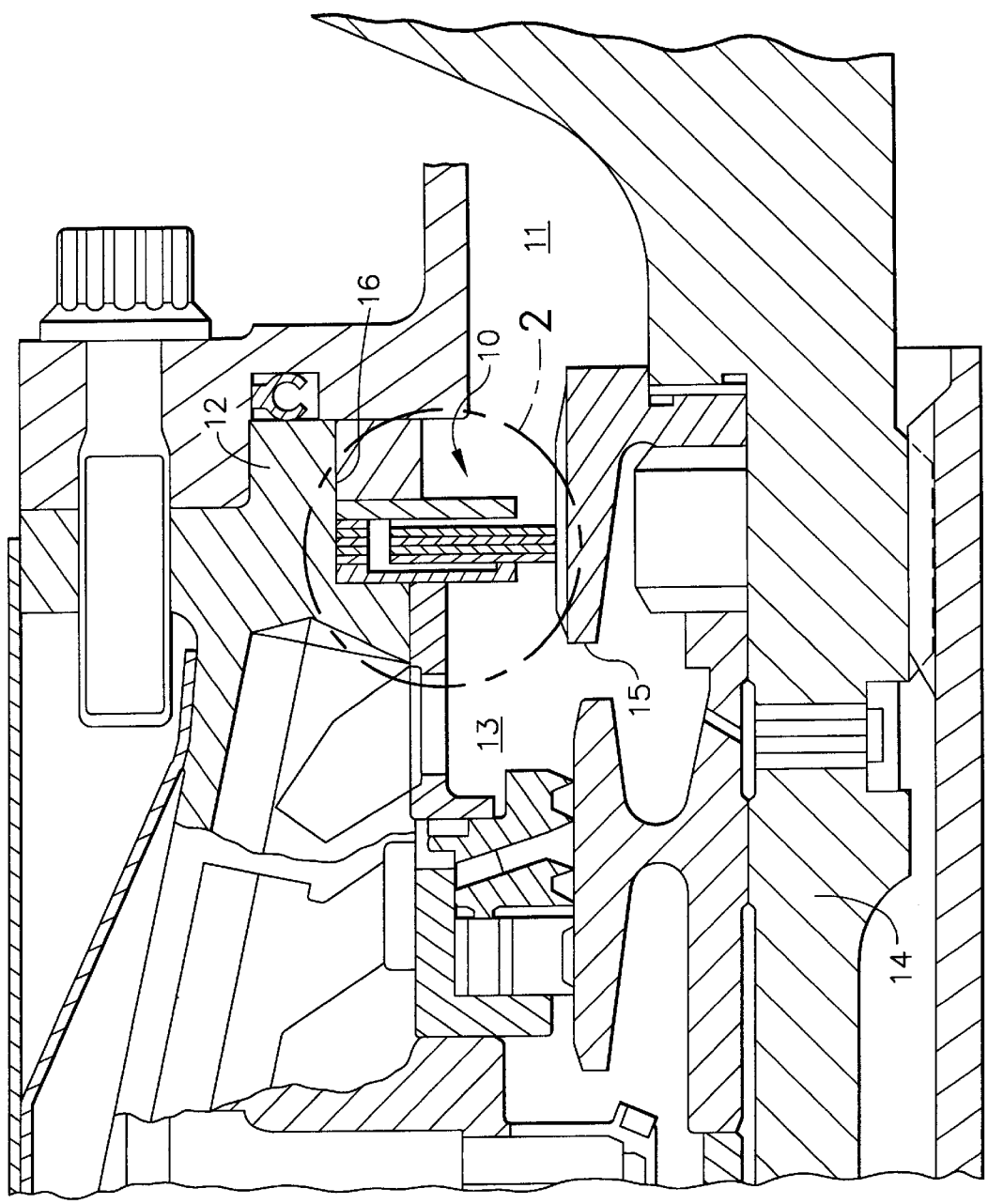
FIG. 1 depicts an upper half axi-symmetric cross-sectional view of a sealing apparatus embodying a seal incorporating features of the invention within a portion of a gas turbine engine.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows a sealing apparatus generally referenced with the numeral 10 mounted in a portion of a gas turbine engine. The sealing apparatus 10 is disposed between a body 12 and a rotating member of the engine such as a seal rotor 15 mounted to a shaft 14 to provide sealing therebetween and to prevent fluid communication between a cavity 11 at a higher fluid pressure than that of cavity 13. The body 12 defines a bore 16 through which passes the rotatable shaft 14 and seal rotor 15. The sealing apparatus 10 is carried by the body 12 at bore 16 and encircles and contacts the seal rotor 15 to provide a rotatable seal as described more fully hereinafter.

Figure 2:
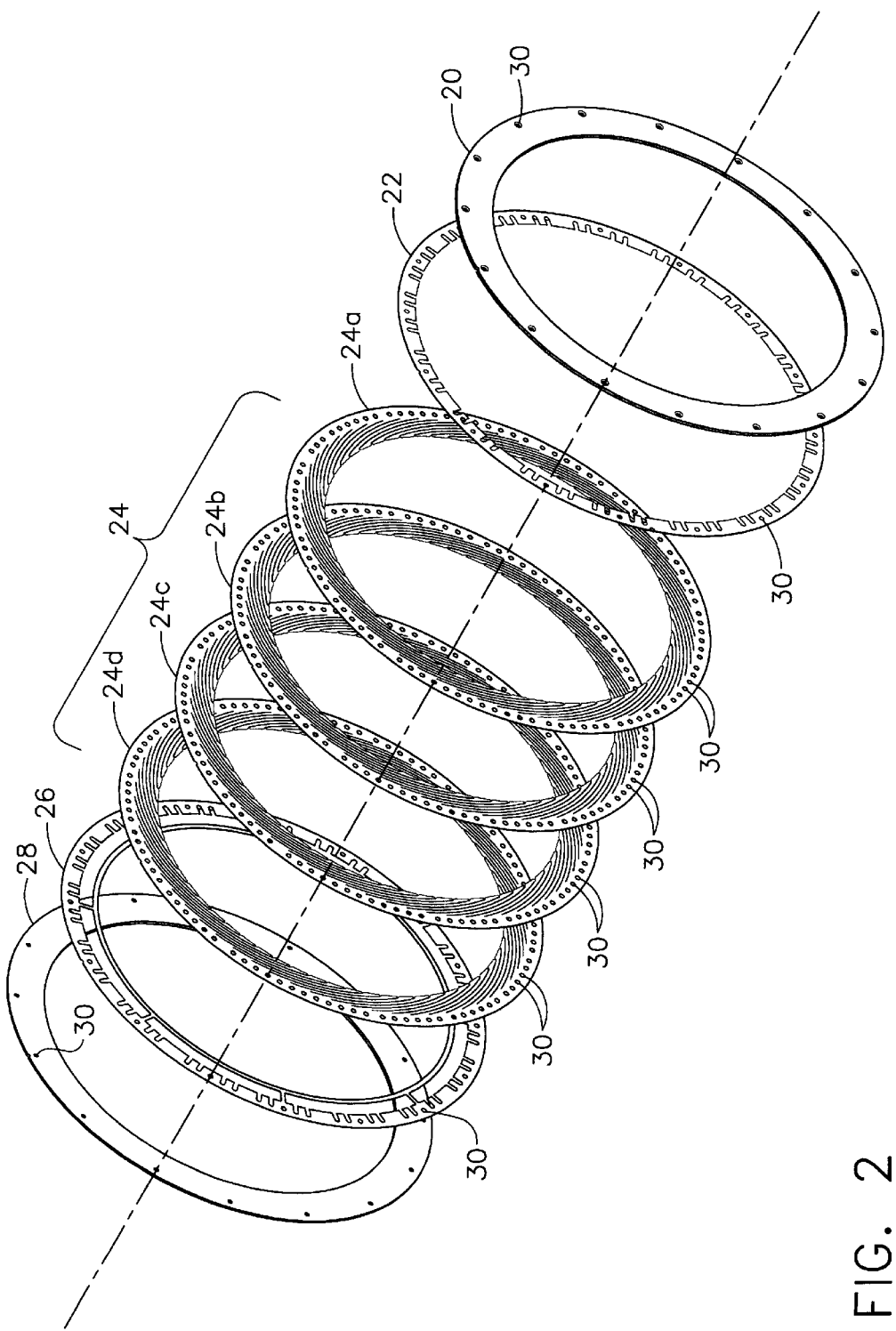
FIG. 2 is an exploded view of the sealing apparatus contemplated by the present invention.

Referring to FIG. 2, the sealing apparatus 10 includes an annular housing comprised of a fore cover plate 20 and an aft cover plate 28. The plates 20 and 28 are carried by body 12 and extend radially inward toward but short of seal rotor 15 or other rotating component. The fore cover plate 20 is disposed on the high pressure side of sealing apparatus 10 while the aft cover plate 28 is on the low pressure side. Disposed between the plates 20 and 28 is a sealing element 24 which in the preferred embodiment is comprised of four, (though the number may vary with different embodiments), thin annular metallic diaphragm members 24a, 24b, 24c, and 24d. A fore spacer 22 is disposed between the cover plate 20 and diaphragm member 24a and an aft spacer 26 is disposed between the aft cover plates 28 and the aft diaphragm member 24d. At a radially outer margin of each of the plates, spacers and diaphragm members are a plurality of circumferentially spaced rivet holes 30. Rivets 32 are mounted through these holes 30 to hold the plates, spacers and diaphragm members together. Note that the diaphragm members 24 have two rivet holes 30 the reason for which will be explained later in the specification.

Figure 5:
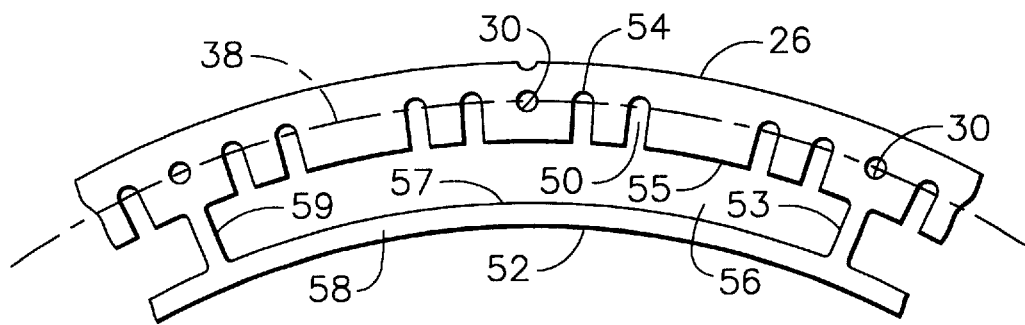
FIG. 5 is an enlarged fragmentary view of the aft spacer.
Figure 6:
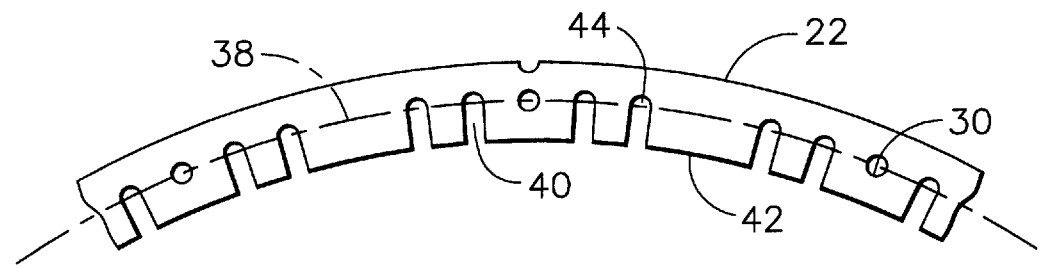
FIG. 6 is an enlarged fragmentary view of the fore spacer.

Referring to FIGS. 5 and 6, the fore spacer 22 is annular and has a plurality of radial passages 40 extending radially outward from the spacer's inner edges 42. These passages 40 are circumferentially disposed and extend only part way into the spacer. Importantly, for reasons explained later, the radial diameter of the radial outer ends 44 of the passages 40 must be greater than an alignment diameter defined by a curved line 38. The aft spacer 26 also has a plurality of circumferentially disposed radial passages 50 that have radial outer ends 54 with diameters greater than the alignment diameter 38. The radial passages 50 extend inward until they reach a cavity 56. The cavity 56 is defined by a radial outer edge 55, a radial inner edge 57, and radially extending walls 53 and 59. In the preferred embodiment there are eight cavities 56 circumferentially disposed in the aft spacer 26. Each of these cavities 56 fluidly communicates with eight of the radial passages 50. It should be appreciated, however, that the number of cavities and radial passages may vary in different embodiments of the present invention. The annular portion of the aft spacer 56 between the inner edge 57 of the cavities and the inner edge 52 of the aft spacer is referred to as a sealing dam 58.

Figure 7:
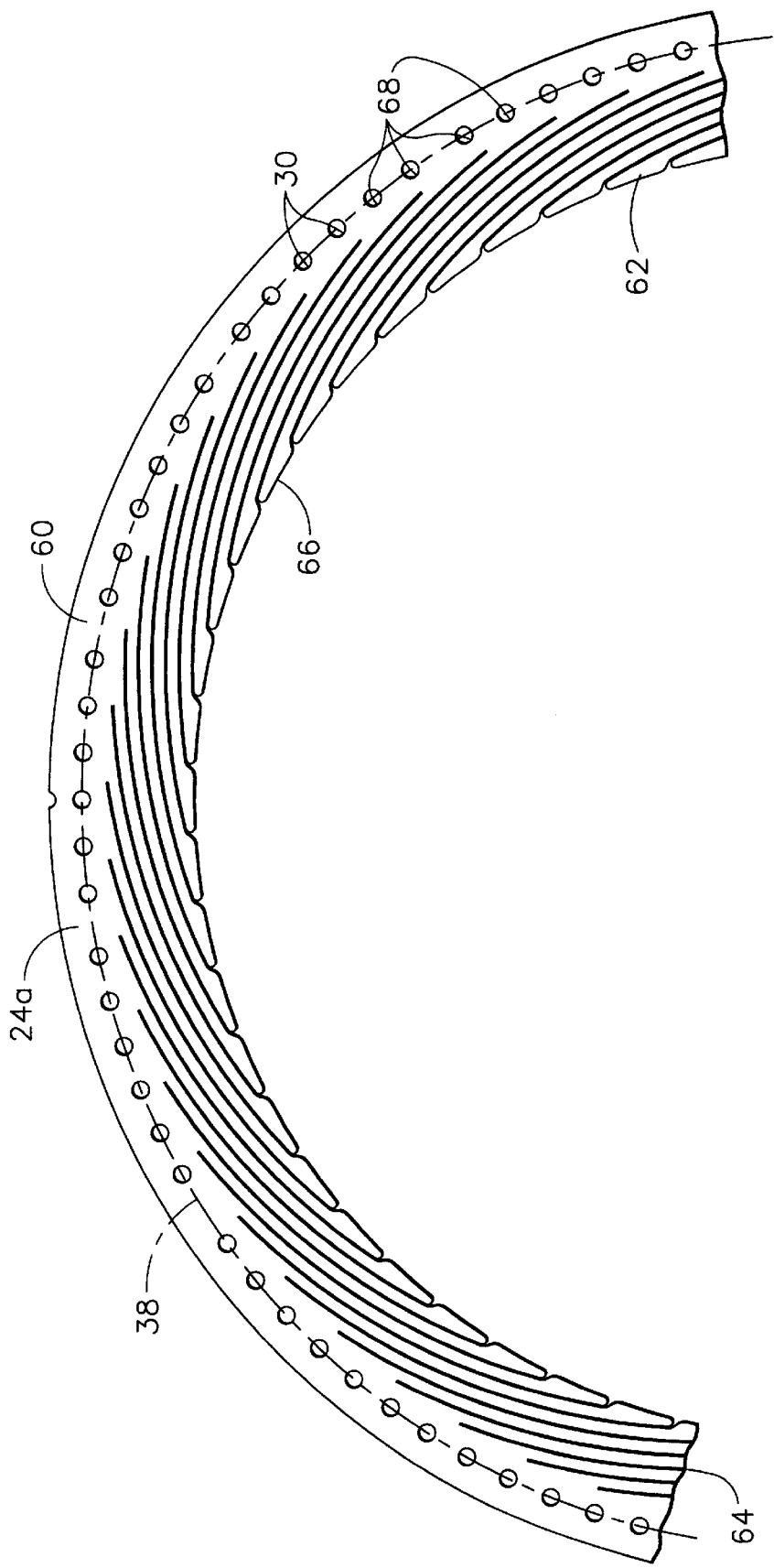
FIG. 7 is an enlarged fragmentary view of a diaphragm member.

In the preferred embodiment, the diaphragm members 24 are those described in Johnson et al., U.S. Pat. No. 5,108,116 which is incorporated herein by reference. In additional embodiments the diaphragm members 24 could be those described in U.S. Pat. Nos. 5,031,922, 5,042,823, 5,071,138, or 5,755,445 which are also incorporated herein by reference. The following description of diaphragm member 24a applies equally to the other diaphragm members 24b–d. Referring to FIG. 7, the diaphragm member 24a is annular and has a circumferentially continuous band portion 60. Rivet holes 30 go through this band portion 60 at the alignment diameter 38. Extending radially inward from this band portion 60 are a plurality of circumferentially uniformly arrayed finger portions 62 each having about the same thickness and ending at a foot portion 66. The finger portions 62 are circumferentially spaced apart to define a plurality of uniform gaps 64 therebetween that are narrower than the finger portions 62. The combination of the band portion 60, the finger portions 62, and the gaps 64 give the diaphragm members 24a a comb-like configuration. The ends of the finger members 62 cooperatively define an inner diameter which is slightly less than the outer diameter of rotor 15. Consequently, when the diaphragm member 24a is received about the rotating rotor 15 a running interference is created between the bottom surfaces of the foot portions 66 and the outer surface of the rotor 15. This interference causes each of the finger members 62 to slightly deflect which in turn cause the bottom surfaces of the foot portions 66 to lightly press against the outer surface of rotor 15. Preferably, the outer surface of rotor 15 is hard coated to reduce wear. To prevent leakage through the gaps 64, each successive diaphragm member is clocked or rotated relative to the preceding diaphragm member. For example, the gaps 64 in diaphragm member 24a are blocked by the finger members 62 of diaphragm member 24b, and the gaps 64 in diaphragm 24b are blocked by the finger members 62 of diaphragm 24c. Thus the need for two rivet holes 30 becomes apparent. The two rivet holes allow the diaphragm members to be clocked relative to each other. It also allows them to be interchangeable which reduces manufacturing costs. In addition to the rivet holes 30, there are also a plurality of circumferentially disposed leakage holes 68 through the band portion 60. These holes 68 are located at the aligning diameter 38.

Figure 3:
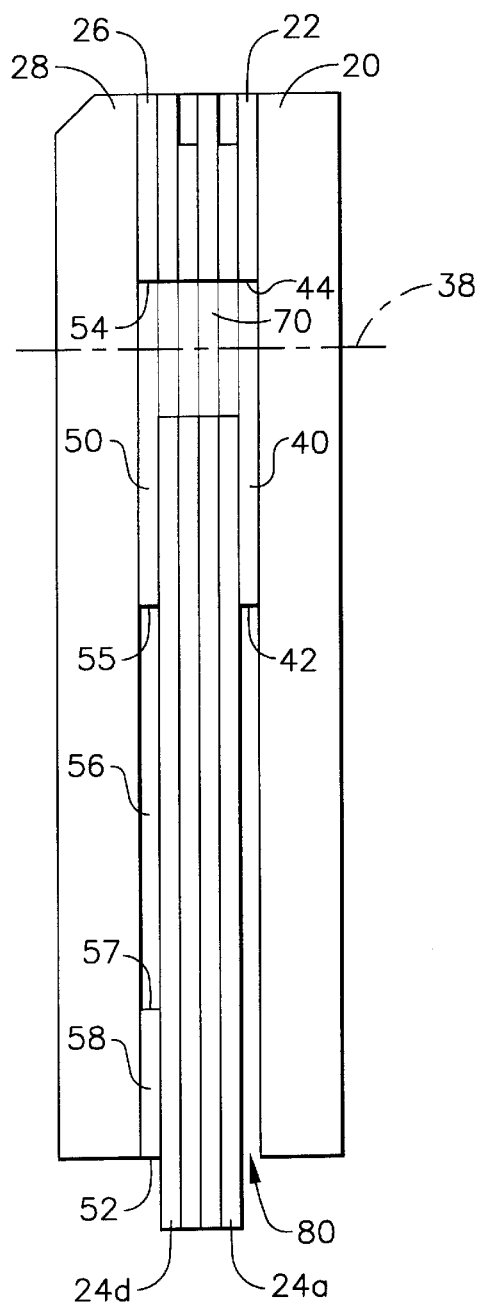
FIG. 3 is a cross sectional view of the sealing apparatus contemplated by the present invention showing the axial flow passage.
Figure 4:
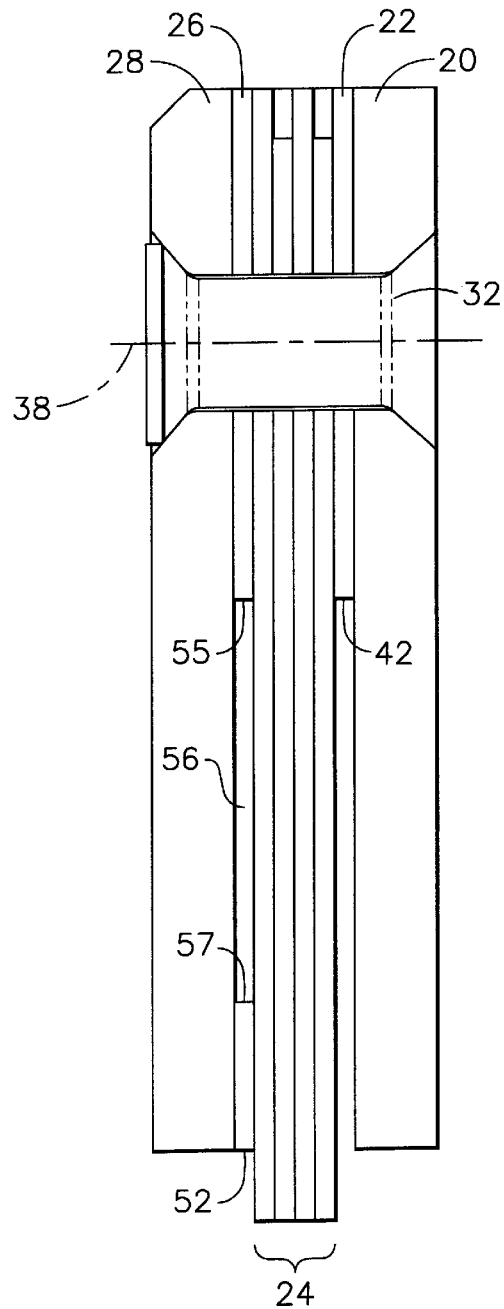
FIG. 4 is a cross sectional view of the sealing apparatus contemplated by the present invention showing the rivet.

Referring back to FIG. 3, when assembled and properly aligned along the alignment diameter, the leakage holes 68 of each of the diaphragm members along with the upper portions of passages 40 and passages 50 define a plurality of axial passages 70. In operation, high pressure air represented by arrow 80 flows radially outward between the fore cover plate 20 and the diaphragm member 24a, through the radial passages 40, through the axial passages 70, through the radial passages 50 and then into the cavities 56. The sealing dam 58 seals the cavities 56 from the low pressure side of the sealing apparatus. The pressure drop or change in pressure from the high pressure side to the cavities 56 is very slight, generating very little thrust. Thus, the net axial force or thrust exerted on sealing element is greatly reduced when compared to the prior art configurations that do not have these pressure balancing passages. With this reduced axial force, the frictional force between aft spacer 26 and the sealing element 24 is reduced which eliminates or greatly reduces binding of sealing element 24 against aft spacer 26. Sealing element 24 is now free to expand and contract radially as required to maintain sealing engagement with rotor 15 during any given engine operating condition.

Although the invention has been described in terms of the illustrative embodiment, it will be appreciated by those skilled in the art that various changes and modifications may be made to the illustrative embodiment without departing from the spirit or scope of the invention. For example, the above-discussed pressure balancing of opposing fore and aft radial passages and a connecting axial passage may be employed in conjunction with any prior art finger seal including those taught in U.S. Pat. Nos. 5,031,922, 5,042,823, 5,071,138, 5,108,116 and 5,755,445 which are herein incorporated by reference. It is intended that the scope of the invention not be limited in any way to the illustrative embodiment shown and described but that the invention be limited only by the claims appended hereto.

What is claimed is:

1. An annular sealing apparatus for disposition in cooperation with a body defining a bore and a rotating member rotatably received in the bore, the bore and rotating member bounding a high fluid pressure region and a relatively lower pressure fluid region therebetween, the sealing apparatus inhibiting fluid leakage between the high and lower fluid pressure regions, the sealing apparatus comprising:

a first cover plate disposed in said high fluid pressure region;

a second cover plate disposed in said lower pressure fluid region;

a sealing element disposed between said first and second cover plates and having at least one diaphragm member;

a first spacer disposed between said first cover plate and said sealing element;

a second spacer disposed between said second cover plate and said sealing element, said second spacer having at least one cavity; and a passageway in fluid communication with said high fluid pressure region and said cavity, wherein said passageway is comprised of at least one radial passage through said first spacer which is in fluid communication with at least one axial passage through said sealing element which is in fluid communication with at least one radial passage in said second spacer which is in fluid communication with said cavity.

2. The sealing apparatus of claim 1 wherein said first spacer is annular and has a plurality of radial passages extending radially outward from its inner edge.

3. The sealing apparatus of claim 2 wherein said second spacer is annular and has a plurality of circumferentially disposed radial passages.

4. The sealing apparatus of claim 3 wherein said second spacer has a plurality of circumferentially disposed cavities.

5. The sealing apparatus of claim 3 wherein each of said cavities is in fluid communication with at least one of said radial passages of said second spacer.

6. The sealing apparatus of claim 5 wherein said second spacer has an annular dam portion that separates said cavities from said low pressure region.

7. The sealing apparatus of claim 1 wherein said sealing element is comprised of a plurality of diaphragm members.

8. The sealing apparatus of claim 7 wherein each of said diaphragm members has a circumferentially continuous band portion 60 and a plurality of circumferentially uniformly arrayed finger portions extending radially inward from said portion.

9. The sealing apparatus of claim 8 each of said finger portions has a foot portion at its inner radial end.

10. The sealing apparatus of claim 9 finger portions are spaced apart to define a plurality of uniform gaps therebetween that are narrower than said finger portions.

11. The sealing apparatus of claim 10 wherein each successive diaphragm member is clocked or rotated relative to adjacent diaphragm members such that said gaps in one of said diaphragm members are blocked by the finger members of adjacent diaphragm members.

12. A method of inhibiting fluid leakage between a high pressure and a relatively lower pressure regions bounded by a bore and a rotating member rotatably received in the bore, the high pressure and relatively lower pressure regions separated by a finger seal comprising a plurality of comb-like members disposed axially between a first and a second cover plate, the method comprising the steps of:

communicating fluid from the high fluid pressure region to a radial passage formed between the first cover plate and the plurality of comb-like members;

communicating said fluid from the radial passage to at least one axial passage formed through the plurality of comb-like members; and communicating said fluid from the axial passage to a cavity formed between the second cover plate and the plurality of comb-like members.

13. A method in accordance with claim 12, comprising the step of:

inhibiting fluid communication of said fluid from said cavity to the lower fluid pressure region.

* * * * *